United States Patent
Shiraishi et al.

(10) Patent No.: US 6,349,162 B1
(45) Date of Patent: Feb. 19, 2002

(54) FIELD-DISTRIBUTION CONVERSION OPTICAL FIBER AND LASER DIODE MODULE COMPRISING THE FIELD-DISTRIBUTION CONVERSION OPTICAL FIBER

(75) Inventors: Kazuo Shiraishi, Saitama; Isamu Oishi, Tokyo, both of (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/403,733

(22) PCT Filed: Feb. 23, 1999

(86) PCT No.: PCT/JP99/00787

§ 371 Date: Oct. 26, 1999

§ 102(e) Date: Oct. 26, 1999

(87) PCT Pub. No.: WO99/44084

PCT Pub. Date: Sep. 2, 1999

(30) Foreign Application Priority Data

Feb. 27, 1998 (JP) .......................................... 10-064010

(51) Int. Cl.$^7$ ............................... G02B 6/02; G02B 6/18
(52) U.S. Cl. ......................... 385/124; 385/122; 385/127
(58) Field of Search .............................. 385/31, 32, 34, 385/43, 48, 55, 59, 123, 124, 127

(56) References Cited

U.S. PATENT DOCUMENTS

| | | | |
|---|---|---|---|
| 4,372,644 A | 2/1983 | Unger | 385/27 |
| 4,701,011 A | 10/1987 | Emkey et al. | 385/28 |
| 5,048,938 A | 9/1991 | Hizney | |
| 5,082,349 A | 1/1992 | Cordova-Plaza et al. | |
| 5,351,323 A | 9/1994 | Miller et al. | 385/28 |
| 5,370,643 A | 12/1994 | Krivoshlykov et al. | |
| 5,774,607 A | 6/1998 | Shiraishi et al. | 385/33 |

FOREIGN PATENT DOCUMENTS

| | | | |
|---|---|---|---|
| JP | 63-33706 | 2/1988 | G02B/6/10 |
| JP | 1-296202 | 11/1989 | G02B/6/10 |
| JP | 6-180404 | 6/1994 | G02B/6/10 |
| JP | 6-242336 | 9/1994 | G02B/6/22 |
| JP | 1-14180 | 3/1998 | C03B/37/012 |

OTHER PUBLICATIONS

International Search Report May 17, 1999.

*Primary Examiner*—Hemang Sanghavi
*Assistant Examiner*—Scott Knauss
(74) *Attorney, Agent, or Firm*—Lacasse & Associates

(57) ABSTRACT

Disclosed is a field distribution converting optical fiber which can be massproduced and enables mutual conversion elliptical field distribution to circular field distribution or vice versa, and a laser diode module in which the field distribution converting optical fiber is used. The optical axis is assumed to be Z, either of the refractive index profiles of a core in the X and Y directions of the orthogonal three axes X, Y and Z is made into a square-law distribution profile, a slope of the refractive index profile in the corresponding X direction is made different from a slope of the refractive index profile in the Y direction. The optical axis propagating in the XZ and XY planes is caused to cyclically change in the Z direction, wherein these cycles are made different from each other to cause the cross-sectional profile of the field distribution of the optical fiber to be cyclically changed. The optical fiber length is made almost coincident with the length of the common multiple between a one-fourth cycle length of a field distribution change cycle of a light beam propagating in the XZ plane in the Z direction and a one-fourth cycle length of a field distribution change cycle of a light beam propagating in the YZ plane in the Z direction, whereby optical waves having elliptical field distribution, which are made incident into the incident side of the optical fiber are caused to outgo from the outgoing side as circular field distribution optical waves.

20 Claims, 10 Drawing Sheets

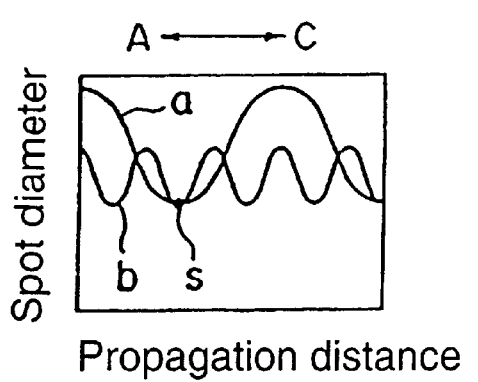
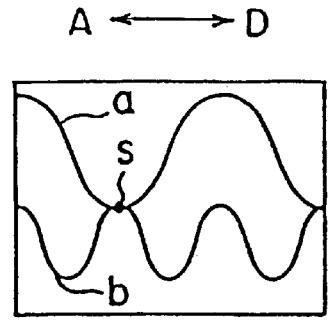
Fig. 10(a)  Fig. 10(b)
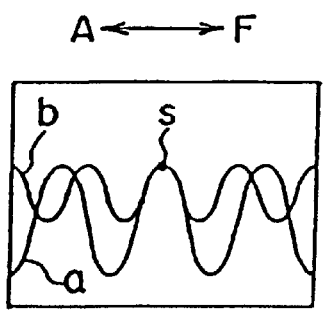
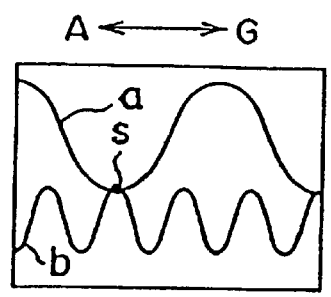
Fig. 10(c)  Fig. 10(d)
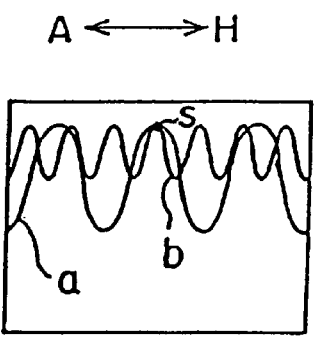
Fig. 10(e)

US 6,349,162 B1

FIELD-DISTRIBUTION CONVERSION OPTICAL FIBER AND LASER DIODE MODULE COMPRISING THE FIELD-DISTRIBUTION CONVERSION OPTICAL FIBER

TECHNICAL FIELD OF THE INVENTION

The present invention relates to a field distribution converting optical fiber, and a laser diode module using the field distribution converting optical fiber, which are used when connecting optical components having different field distributions to each other in a case where, for example, in an optical transmission and sensor field, an optical component having a circular cross section to an optical component having an elliptical cross section exists.

BACKGROUND ARTS

Optical fibers have been used for optical transmission, and the cores of optical fibers are covered with cladding. The cross sectional shape of the core of an optical fiber generally is circular (that is, the section where an optical fiber is cut off in a plane XY where it is assumed that the optical axis of the optical fiber is Z, and three axes orthogonal to each other are X, Y and Z). In addition, the light intensity distribution, on the plane XY, of light propagating in the core is also circular. On the other hand, as for a semiconductor laser and a planar optical waveguide, generally, the light intensity distribution on the plane XY is elliptical. Therefore, when connecting an optical component of a semiconductor laser and a planar optical waveguide, etc., to the above optical fiber, an optical connection loss occurs due to a difference between the field distribution (electric field distribution) at the connection end faces of these optical components and the field distribution of the optical fiber. Moreover, an optical connection loss resulting from such a difference between the field distributions is called a mode non-matching loss.

For example, FIG. 13 shows a result of an investigation of an optical connection loss between an optical component having an elliptical field distribution and an optical component having a circular field distribution, changing the aspect ratio (ratio of the major axis to the minor axis) of an elliptical shape in the optical component having an elliptical field distribution. As has been made clear in this drawing, if an optical component having elliptical field distribution exists, the aspect ratio of which is 3 or more, to an optical component having circular field distribution, it can be understood that an optical connection loss of 2dB or more occurs. In addition, in FIG. 13, the spot diameter of either the X or Y direction of the above elliptical field distribution is made coincident with the spot diameter of the above circular field distribution.

Therefore, for example, the following optical fiber is disclosed in Laid-open patent application No. 33706 of 1988 filed and laid open in Japan. That is, the optical fiber has an elliptical core 2 such as that shown in FIG. 14, wherein one end side of a single mode optical fiber, in which the refractive index distribution of the core 2 is uniform, is heated to cause a dopant to be diffused, which is contained in the core 2 or cladding 3, whereby the cross-sectional shape of the core 2 at one end side of the optical fiber is made roughly circular. Then, the core profile becomes an elliptical shape at the end side 11 of an optical fiber, and the core profile at the end side 12 (where the above heating is carried out) becomes a circular shape. In such an optical fiber, the field distribution of optical waves propagating in the optical fiber becomes elliptical at the end side 11 of the optical fiber, and becomes circular at the end side 12 of the optical fiber, wherein mutual conversion of an ellipse and a circle in the field distribution is performed, and such an optical fiber can be used as a field distribution converting optical fiber.

However, in a field distribution converting optical fiber formed by utilizing dopant diffusion like an optical fiber shown in FIG. 14, there were the following shortcomings and problems.

(1) In the optical fiber shown in FIG. 14, the normalizing frequency viewed in the greater diameter direction of an elliptical core before diffusion of a dopant is different from that view in the minor diameter direction, and the aspect ratio of the field distribution does not become greater than the aspect ratio of the core 2. Therefore, the aspect ratio of the field distribution of the end part 11 of an optical fiber is smaller than the aspect ratio of the core 2, for example, the aspect ratio of the field distribution is 2 at the most, wherein such an elliptical optical fiber will have a field distribution very similar to that of a circular optical fiber. Therefore, if such an optical fiber as shown in FIG. 14 is used, mutual conversion is impossible between an ellipse and a circle as regards the field distribution.

(2) If the above dopant diffusion is utilized, the elliptical field distribution may be shaped to be circular in only the direction of expanding the field distribution. Therefore, there was such a problem by which a large elliptical profile could not be converted to a small circular profile.

(3) Since it takes a long time to obtain a dopant diffusion, productivity is not satisfactory. Moreover, unless the portion at which a part of an. optical fiber is partially heated is accurately taken out, it is impossible to utilize the optical fiber as a field distribution converting optical fiber. Therefore, after being partially heated, the optical fiber must be accurately cut off one by one, whereby working efficiency worsens, and it is difficult to mass produce the field distribution converting optical fibers.

It is therefore an object of the invention to provide a field distribution converting optical fiber which can solve such shortcomings and problems, and a laser diode module using the field distribution converting optical fiber.

That is, it is an object of the invention to provide a field distribution converting optical fiber, which can be mass produced, capable of universally carrying out mutual conversion between field distribution of an elliptical profile and field distribution of a circular profile in either direction of reduction, equal magnification (mutual conversion between a circle having a diameter which is the same as the major or minor axis of an ellipse, and an ellipse), or enlargement as, for example, in conversion between the field distribution of a laser diode and the field distribution of an optical fiber, and a laser diode module using the field distribution converting optical fiber.

DISCLOSURE OF THE INVENTION

A field distribution converting optical fiber according to the first aspect of the invention is an optical fiber having cladding covered around its core, which is composed so that the optical axis is assumed to be Z, either of the refractive index profiles of the above core in the X and Y directions of the orthogonal three axes X, Y and Z orthogonal to each other is made into a square-law distribution profile, a slope of the refractive index distribution in the corresponding X direction is made different from a slope of the refractive index distribution in the Y direction, and the optical fiber length is made almost coincident with the length of the common multiple between a one-fourth cycle length of a field distribution change cycle of a light beam propagating in the XZ plane in the Z direction and a one-fourth cycle length of a field distribution change cycle of a light beam propagating in the YZ plane in the Z direction.

A field distribution converting optical fiber according to the second aspect of the invention is an optical fiber having cladding covered around its core, which is composed so that the optical axis is assumed to be Z, either of the refractive index profiles of the above core in the X and Y directions of the orthogonal three axes X, Y and Z orthogonal to each other is made into a square-law distribution profile, a slope of the refractive index distribution in the corresponding X direction is made different from a slope of the refractive index distribution in the Y direction, either field distribution in the X direction or Y direction satisfies conditions for which light does not change while propagating in the optical fiber, and the optical fiber length is almost coincident with the length of a multiple of a one-fourth cycle length of the field distribution change cycle, in the Z direction, of a light beam propagating in the XZ plane or YZ plane, which changes due to propagation of light.

A field distribution converting optical fiber according to the third aspect of the invention is characterized in that, in a field distribution converting optical fiber provided with the first and second aspects, the cross-sectional shape of the core is made roughly elliptical, roughly ellipsoidal-shaped or roughly rectangular.

A field distribution converting optical fiber according to the fourth aspect of the invention is characterized in that a single mode optical fiber is provided at one end side of a field distribution converting optical fiber according to the first or second aspect of the invention.

A field distribution converting optical fiber according to the fifth aspect of the invention is characterized in that a single mode optical fiber is provided at one end side of a field distribution converting optical fiber according to the third aspect of the invention.

A field distribution converting optical fiber according to the sixth aspect of the invention is an optical fiber having cladding covered around the core, and is characterized in that the optical axis is assumed to be Z, either of the refractive index profiles of the above core in the X and Y directions of the orthogonal three axes X, Y and Z orthogonal to each other is made into a square-law distribution profile, the slope of the refractive index distribution in the corresponding X direction is made equal to the slope of the refractive index distribution in the Y direction, wherein an optical fiber is formed so that the optical fiber length thereof is made almost coincident with the odd number times the one-fourth cycle of the field distribution changing cycle, in the Z axis direction, of a light beam propagating in the XZ plane and YZ plane, and the optical fiber intervenes between a field distribution converting optical fiber according to the first or second aspect and the single mode optical fiber.

A field distribution converting optical fiber according to the seventh aspect of the invention is an optical fiber having cladding covered around the core, and is characterized in that the optical axis is assumed to be Z, either of the refractive index profiles of the above core in the X and Y directions of the orthogonal three axes X, Y and Z orthogonal to each other is made into a square-law distribution profile, the slope of the refractive index distribution in the corresponding X direction is made equal to the slope of the refractive index distribution in the Y direction, wherein an optical fiber is formed so that the optical fiber length thereof is made almost coincident with the odd number times the one-fourth cycle of the field distribution changing cycle, in the Z axis direction, of a light beam propagating in the XZ plane and YZ plane, and the optical fiber intervenes between a field distribution converting optical fiber according to the third aspect and the single mode optical fiber.

A laser diode module in which a field distribution converting optical fiber according to the invention is used is characterized in that a laser diode is connected to the input side of a field distribution converting fiber as set forth in any one of the first to seventh aspects of the invention.

It is commonly known that as regards a field distribution of optical waves propagating in an optical fiber in which the refractive index profiles of a core in the X and Y directions are square-law distribution profiles, the spot diameter thereof cyclically changes when the optical axis of the optical fiber is Z and the three axes orthogonal to each other are X, Y and Z.

Therefore, the present applicant, et al. propagated Gaussian type light, that is, light of field distribution in which the optical intensity distribution becomes normal distribution with respect to the radius of an optical fiber, in an optical fiber of a circular core in which the refractive index profile in the above X, Y directions is a square-law distribution profile. And, the applicant, et al. investigated how the field distribution of light changed in the lengthwise direction of the optical fiber when the light was propagated in the optical fiber.

The result is shown in FIG. 12. Further, in the same drawing, the abscissa indicates a propagation distance of optical waves, and the ordinate indicates the spot diameter of field distribution. The field distribution of optical waves propagating in optical fibers has a tendency where it becomes greater and greater toward the center of the optical fibers and becomes smaller and smaller toward the outer circumference of the optical fibers. For example, FIG. 5($b$) shows one example of a field distribution of optical waves incident into the optical. fibers in the Y direction on the XY sectional plane. Therefore, in the present specification, it is assumed that, as shown in FIG. 5($b$), the width of a range, which has a greater field size than 1/e (where e is the bottom of the natural logarithm) where the center field distribution is 1, is called a "spot diameter".

In addition, where the field distribution size is expressed in terms of intensity, for example, where the center field intensity is 1, a range having field intensity distribution which is greater than the intensity of $1/e^2$ is called a spot diameter.

As has been made clear in FIG. 12, the spot diameter of field distribution cyclically changes in the lengthwise direction of an optical fiber in line with propagation of light. In detail, in the optical fiber, the above spot diameter which is 10 $\mu$m at the incident end of the optical fiber cyclically changes in a range from 10 $\mu$m to 6 $\mu$m in line with propagation of light.

Furthermore, the example illustrated in FIG. 12 shows the results obtained with respect to an optical fiber, the Ag value of which is 45 $\mu$m where Ag=a/$\sqrt{(2\delta)}$ is defined when the relative refractive index difference (n1–n2)/n2 between the refractive index n1 of the core center of an optical fiber and the refractive index n2 of cladding is $\Delta$, and the core radius is a. Resultantly, when propagating optical waves are expressed in terms of light beam, the field distribution change cycle of the light beam in the Z axis direction becomes 2$\pi$Ag, and it is found that the spot diameter of field distribution repeats the minimum value and the maximum value once every one-fourth cycle length of the field distribution change cycle of the light beam.

Also, where the spot radii (half the spot diameter) at adjacent extreme values, respectively, were w1 and w2 and the wavelength of light was λ, it was found on the basis of examinations carried out by the applicant that the relationship of w1·w2=λAg/nπ is established. It was also found that, at a position which is the integral number times the one-fourth cycle length of the above field distribution change cycle, the phase distribution of light beam became flat. In other words, it was found that light could reach the position, which is the integral number times the one-fourth cycle length of the above field distribution change cycle, in a state where the speeds of light beams passing through various channels in an optical fiber are made coincident with each other and the light intensity of light was not produced due to the interference of light passing through the above various channels.

Based on the results of the above examinations, in the field distribution converting optical fiber thus constructed according to the invention, the field distribution of optical waves is designed so as to cyclically change with respect to the lengthwise direction (Z axis direction) of an optical fiber, as has been made clear in the results of the examinations shown in FIG. 12, by making either of the refractive index profiles of a core of three axes X, Y and Z orthogonal to each other in the X or Y directions into a square-law distribution profile as shown in, for example, FIGS. 11(a) and (b), where the optical axis of the optical fiber is Z.

Further, in a field distribution converting optical fiber according to the invention, as shown in FIG. 11, by making slopes different from each other where either of the refractive index distributions in the above X or Y direction is made into a square-law distribution profile, the field distribution changing cycle of light beams propagating in the XZ plane and the field distribution changing cycle of light beams propagating in the YZ plane differ in the X and Y directions. Therefore, by making the slopes of the square-law distribution profile into values which are different from each other, the field distribution changing cycle of light beams propagating in the XZ plane and the field distribution changing cycle of light beams propagating in the YZ plane are made different in the X and Y directions, wherein the cross-sectional profile (the sectional profile where being cut off in the XY plane) of the field distribution with respect to a propagation distance of optical waves propagating in an optical fiber can be cyclically made elliptical or circular. In addition, in a field distribution converting optical fiber according to the invention, as described above, by making either of the refractive index distributions in the above X or Y direction into a square-law distribution profile and making the slope thereof into values which are different from each other, the aspect ratio of an ellipse can be cyclically changed freely.

With a field distribution converting optical fiber according to the first aspect of the invention, the optical axis of an optical fiber is made into Z, the refractive index profiles of the core in the X and Y directions of the three axes X, Y, and Z orthogonal to each other are made into a square-law distribution profile in either case, the field distribution of optical waves is designed so as to cyclically change with respect to the lengthwise direction (Z axis direction) of the optical fiber, and slopes of the refractive index distribution in the above X and Y directions are made into values which are different from each other, wherein the cycle of field distribution change of a light beam propagating in the XY plane can be made different from the cycle of field distribution change of a light beam propagating in the XZ plane. Therefore, with a field distribution converting optical fiber according to the invention, the cross-sectional profile (the sectional profile where being cut off in the XY plane) of a field distribution with respect to a propagation distance of optical waves propagating in an optical fiber can be cyclically made circular or elliptical. Further, the aspect ratio of an ellipse can be cyclically changed freely.

And, with a field distribution converting optical fiber according to the first aspect of the invention, since an optical fiber length is constructed so as to be made coincident with a length which is a common multiple of the one-fourth cycle length of a field distribution change cycle, in the Z axis direction, of a light beam propagating in the XZ plane, and a one-fourth cycle length of a field distribution change cycle, in the Z axis direction, of a light beam propagating in the YZ plane, for example, optical waves having field distributions of an elliptical profile are made incident from the incident side of an optical fiber and the field distribution at the outgoing side of the optical fiber can be made circular, and the reverse can be carried out. Further, with a field distribution converting optical fiber according to the first aspect of the invention, mutual conversion from elliptical field distribution to circular field distribution or vice versa can be freely and easily carried out in any direction of reduction and enlargement or at an equal magnification (mutual conversion from an ellipse to a circle whose diameter is the same as the minor axis or major axis of the ellipse, or vice verse). And, with the field distribution converting optical fiber according to the first aspect of the invention, it is possible to produce excellent field distribution converting optical fibers whose productivity is improved.

Further, the applicant confirmed that, if an inherent spot diameter is made incident in connection with incident light even though the refractive index distribution of an optical fiber in the X and Y directions presented a square-law distribution profile as described above, the field distribution in any one of the X and Y directions does not change when it propagates in the optical fiber. In other words, if the refractive index distribution slope of an optical fiber in the X or Y direction is set to a refractive index slope at which the spot diameter of incident light is not changed, the light field distribution in the direction does not change when light propagates in the optical fiber. In detail, if a condition of w1=w2 is satisfied in an expression of w1·w2 λAg/nπ, it was found that the incident spot diameter does not change.

Therefore, in a field distribution converting optical fiber according to the second aspect of the invention, the refractive index distribution slope of the above core at one side in the X and Y directions was established so that the field distribution in either X or Y direction can meet the condition when light propagates in the optical fiber. Further, a field distribution converting optical fiber according to the second aspect of the invention was constructed so that the optical fiber length is made roughly coincident with a length which is a multiple of the one-fourth cycle length of the field distribution change cycle, in the Z axis direction, of propagating light beams in the XZ plane or YZ plane which may change in line with propagation of light. Thus, the field distribution converting optical fiber according to the second aspect of the invention enables cyclic changes of light field distribution in the lengthwise direction of the optical fiber and mutual conversion from an elliptical field distribution to a circular field distribution or vice versa as in the field distribution converting optical fiber according to the first aspect of the invention.

That is, with a field distribution converting optical fiber according to the second aspect of the invention, since the refractive index profile of the above core at any one of the above X and Y directions of the optical fiber is made into a square-law distribution profile having Ag where the slope becomes w1=w2, it becomes possible to make the cross-sectional profile of the field distribution cyclically circular or elliptical with respect to the propagation distance of optical waves propagating in the optical fiber as in the field distribution converting optical fiber according to the first aspect of the invention, wherein the aspect ratio of the ellipse can be cyclically changed freely.

In addition, with a field distribution converting optical fiber according to the second aspect of the invention, mutual conversion from elliptical field distribution to circular field distribution or vice versa can be freely and easily carried out in any one of the directions of reduction and enlargement of the field distribution or at an equal magnification as in the field distribution converting optical fibers according to the first aspect of the invention. Moreover, the optical fibers can be produced very efficiently.

Further, with a field distribution converting optical fiber according to the third aspect of the invention, in which the cross-sectional profile of a core is made roughly elliptical, roughly ellipsoidal-shaped, or roughly rectangular, it is easy to configure the refractive index profile of the core as described above, and it is possible to make incident the light of an elliptical field distribution profile.

In addition, with field distribution converting optical fibers according to the fourth and fifth aspects of the invention, in which a single mode optical fiber is provided at one end side of the field distribution converting optical fiber according to the first, second, or third aspect of the invention, the optical fibers can be made integral with the single mode optical fiber, wherein, for example, the optical fiber can be directly connected to a laser diode for use.

Further, with a field distribution converting optical fiber according to the sixth or seventh aspect of the invention, the refractive index profiles of the core are, respectively, made into a square-law distribution profile, the slopes of the refractive index distribution in the corresponding X and Y directions are set to equal values, and the optical fiber length is formed so as to be made almost coincident with an odd number times the one-fourth cycle length of the field distribution change cycle, in the Z direction, of a light beam propagating in the XZ plane and YZ plane, wherein by such an optical fiber, it is possible to convert circular field distribution to another circular field distribution, the spot diameters of which are different from each other. In addition, by conversion from circular field distribution to another circular field distribution, the spot diameters of which are different from each other and field distribution conversion from a circle to an ellipse or vice versa by field distribution converting optical fibers according to the first, second, or third aspect of the invention, it is possible to easily connect an optical fiber of elliptical field distribution such as, for example, a laser diode, to a single mode optical fiber.

Furthermore, with a laser diode module according to the invention, laser light of elliptical field distribution, which is emitted from a laser diode, can be converted to a circular profile by a field distribution converting optical fiber and made incident, an optical fiber for optical transmission, which has a circular core, can be optically connected to a laser diode at a low connection loss.

BRIEF DESCRIPTION OF THE DRAWINGS

FIGS. 10(a) to 10(e) are explanatory views showing the relationship between a spot diameter and a propagation distance of optical waves propagating in an optical fiber when mutual conversion from circular field distribution to elliptical field distribution or vice versa, illustrated in FIG. 9, is carried out by a field distribution converting optical fiber, FIGS. 11(a) and (b) explanatory views showing one example of refractive index profiles of the core of an optical fiber in the X and Y direction, respectively.

BEST MODE FOR CARRYING OUT THE INVENTION

In order to describe the present invention in detail, a description is given of preferred embodiments with reference to the accompanying drawings. Further, in the description of the preferred embodiments, parts which have the same names as those mentioned in the example in the technical background are given the same reference numbers, and an overlapping description thereof is omitted.

Figure 1:
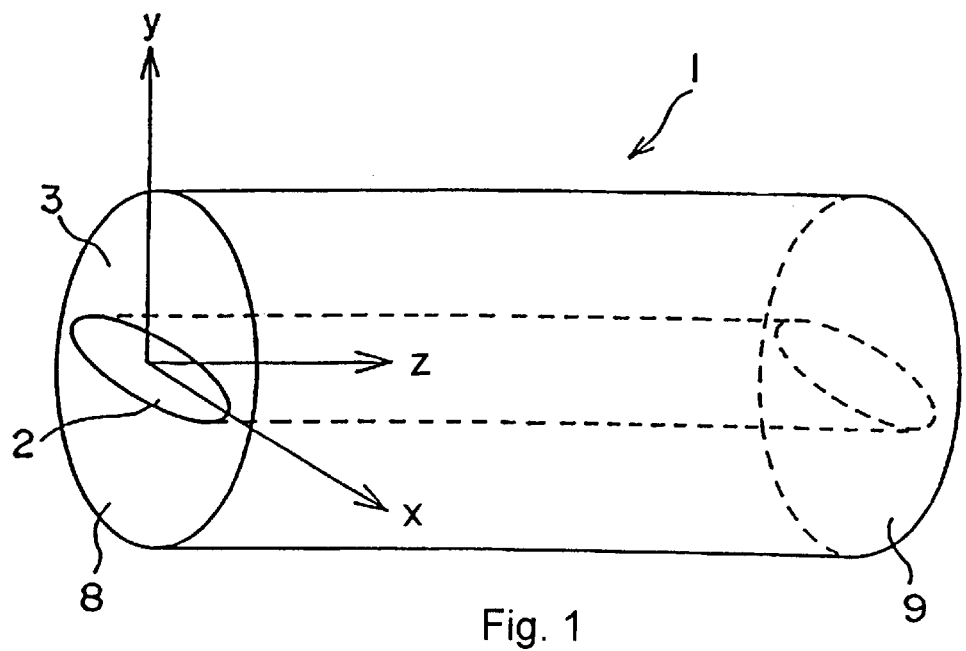
FIG. 1 is a perspective view showing the configuration of major parts in one preferred embodiment of a field distribution converting optical fiber according to the invention.

In FIG. 1, a configuration, illustrated in a perspective view, of one preferred embodiment of a field distribution converting optical fiber according to the invention is shown. As shown in FIG. 1, a field distribution converting optical fiber 1 according to the preferred embodiment is an optical fiber having cladding 3 covered around the core 2, the optical axis of which is Z. The cross-sectional profile of the above core 2 (that is, the section in the XY plane of three axes X, Y, and Z orthogonal to each other) presents an elliptical profile. The core diameter in the X direction is 120 $\mu$m, and the core diameter in the Y direction is 40 $\mu$m. Therefore, the aspect ratio of the above core is 3.

Figure 2A:
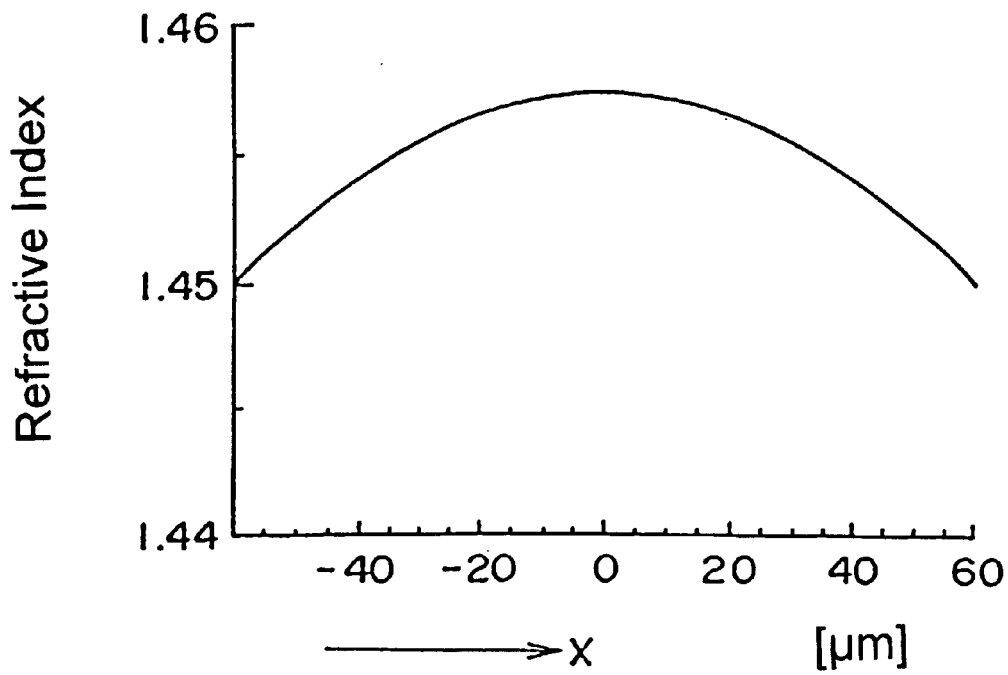
FIGS. 2(a) and 2(b) are graphs showing the refractive index distribution structure in the X and Y direction, respectively in the preferred embodiment of the field distribution converting optical fiber according to the invention.
Figure 2B:
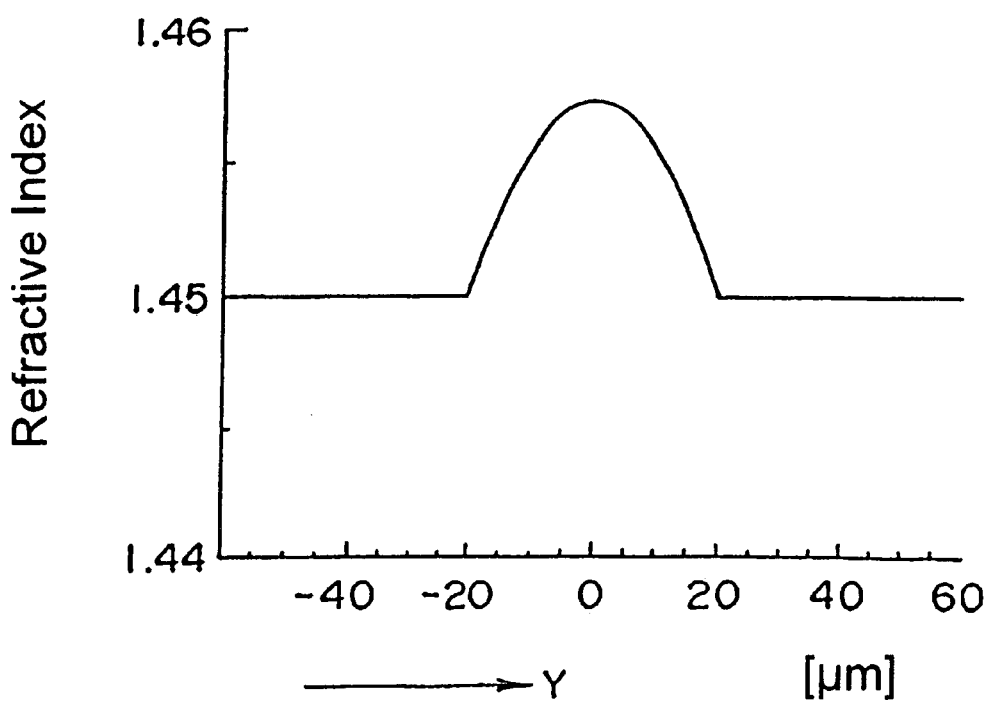

FIGS. 2(a) and (b), respectively, show a refractive index profile of the core 2 in the above X and Y directions. As shown in FIG. 2, either of the refractive index profiles of the core 2 in the X or Y direction is a square-law distribution profile, the slopes of the refractive index distribution in the X and Y directions are made into values that differ from each other.

If the refractive index distribution structure of the core 2 of the field distribution converting optical fiber 1 is configured as shown in FIG. 2, the field distribution of optical waves will cyclically change with respect to the lengthwise direction of the field distribution converting optical fiber 1, wherein the field distribution change cycle of a light beam propagating in the XZ plane in the Z axis direction is made different from the field distribution change cycle of a light beam propagating in the YZ plane.

Figure 3:
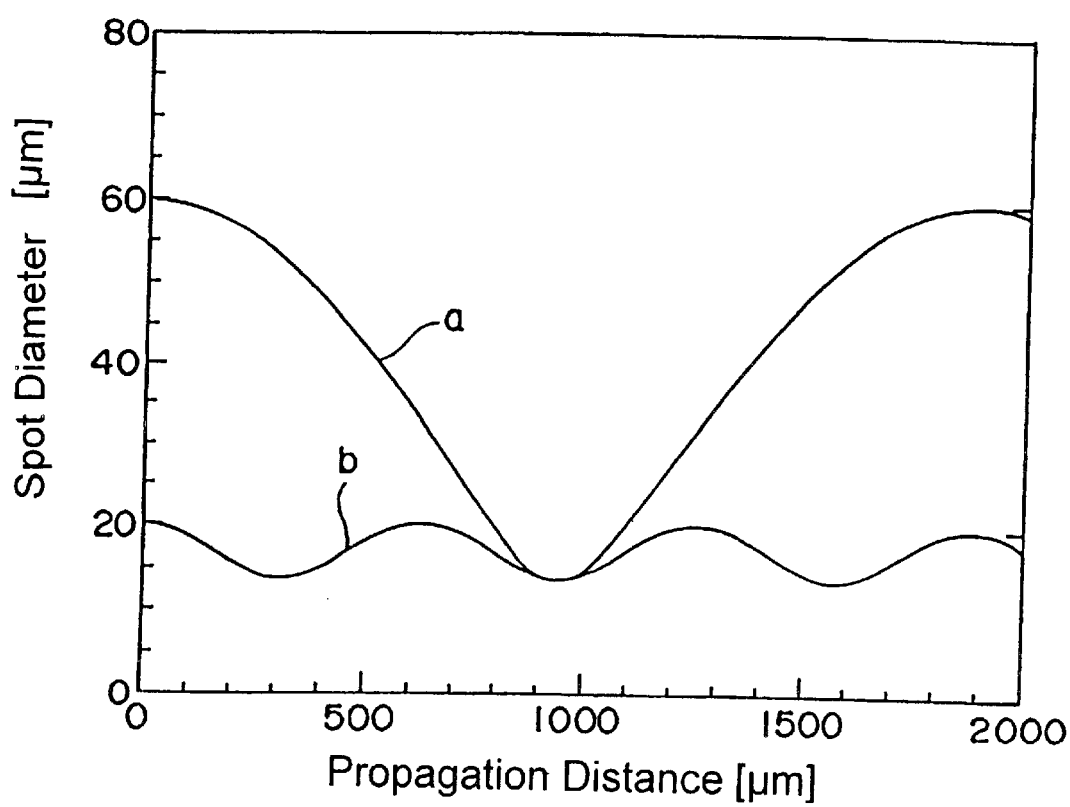
FIG. 3 is a graph showing changes of a spot diameter of a field distribution in the X and Y directions with respect to a propagation distance of light when optical waves having an elliptical field distribution profile of an aspect ratio 3 are made incident into a square-law distribution profile optical fiber, which has an elliptical profile core of an aspect ratio 3, having different slopes in the refractive index profile in the X and Y directions.

FIG. 3 shows changes in a spot diameter of the field distribution in the X and Y directions when elliptical light having a spot diameter of 60 $\mu$m in the X direction and a spot diameter of 20 $\mu$m in the Y direction is made incident where the above Ag value of the field distribution converting optical fiber 1 in the X direction is 600 $\mu$m, and the Ag value in the Y direction is 200 $\mu$m. Further, a characteristic line a in FIG. 3 shows changes in the spot diameter of the above field distribution in the X direction, and another characteristic line b shows changes in the spot diameter of the above field distribution in the Y direction.

As has been made clear in FIG. 3, although the spot diameters of the above field distribution in the X and Y directions cyclically change, the cycles thereof are different from each other. For example, at a position of one-fourth cycle length of the field distribution cycle in the Z direction of a light beam propagating in the XZ plane detected by the characteristic line a in the same drawing, and at a position of three-fourths cycle length of the field distribution change cycle in the Z direction of a light beam propagating in the YZ plane, that is, in the vicinity of a propagation distance of 950 $\mu$m, the spot diameters of field distribution in the X and Y directions become equal to each other. In addition, in the same drawing, results from having investigated changes in the spot diameters of the above field distribution in the X and Y directions till a propagation distance of 2000 $\mu$m of the field distribution converting optical fiber 1 are illustrated. However, as described above, since the characteristic lines a and b cyclically change altogether, cyclic changes in the spot diameters as shown in the characteristic lines a and b in the same drawing are produced in an area exceeding the propagation distance of 2000 $\mu$m of the field distribution converting optical fiber 1.

The present applicant et al. constructed a field distribution converting optical fiber 1 having a length of the field distribution converting optical fiber 1 according to the preferred embodiment, which is a common multiple length of the odd number times the one-fourth cycle length of the field distribution change cycle in the Z axis direction of a light beam propagating in the above XZ plane and the odd number times the one-fourth cycle length of the field distribution change cycle in the Z axis direction of a light beam propagating in the YZ plane on the basis of the results of simulation shown in FIG. 3. In detail, the length of the field distribution converting optical fiber according to the preferred embodiment is a one-fourth cycle length of the field distribution change cycle in the Z direction of a light beam propagating in the XZ plane and a three-fourths cycle length of the field distribution change cycle in the Z axis direction of a light beam propagating in the YZ plane, that is, the same is 922 $\mu$m.

In addition, FIG. 4 shows one example of a method for producing field distribution converting optical fiber 1 according to the preferred embodiment, and in the method, a technology for producing elliptical core single mode optical fibers, in which the refractive index distribution of either of the cores is uniform.

Figure 4A:
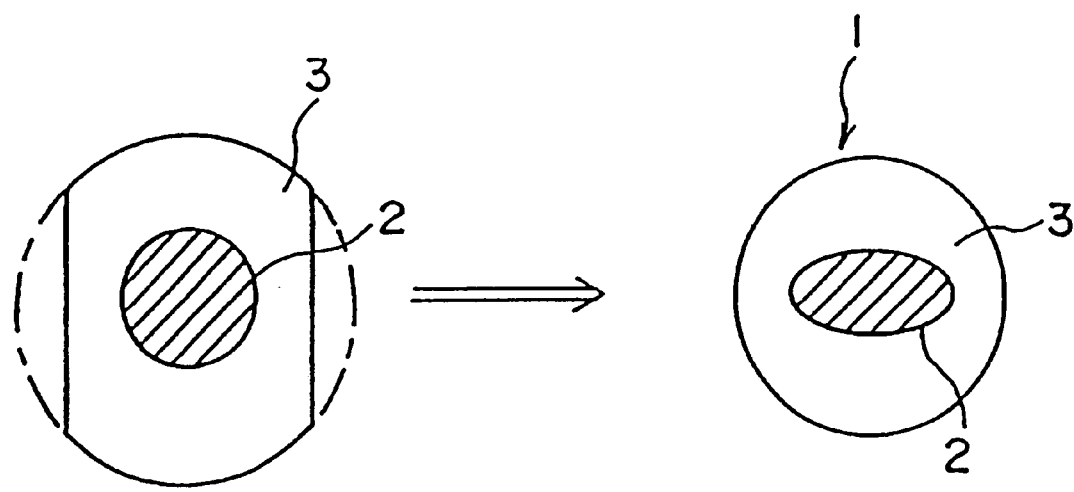
FIG. 4(a) is an explanatory view showing an example of a method for producing field distribution converting optical fibers according to the invention.

With the method shown in FIG. 4(a), a preform of an optical fiber, in which the cross-sectional profile of the core 2 and cladding 3 are both circular and the refractive index profiles of the core 2 in the X and Y directions are square-law distribution profiles, is used, a part of the side of the cladding 3 is deleted, and the optical fiber is drawn, wherein the cross-sectional profile of the core 2 is made elliptical.

Figure 4B:
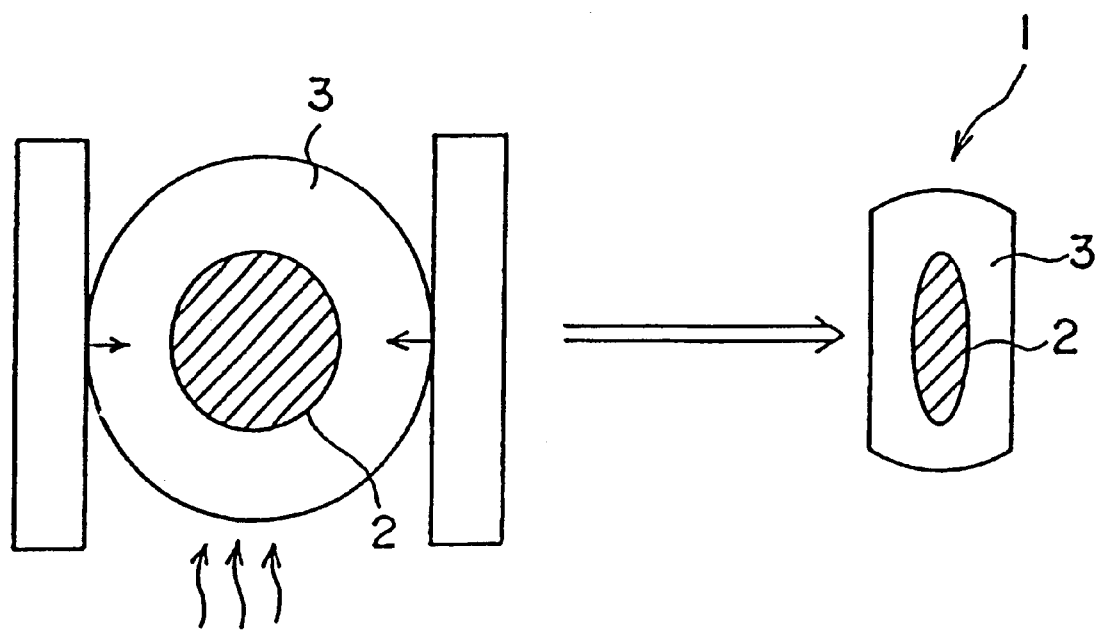
FIG. 4(b) is an explanatory view showing an example of a further method for producing field distribution converting optical fibers according to the invention.
Figure 5A:
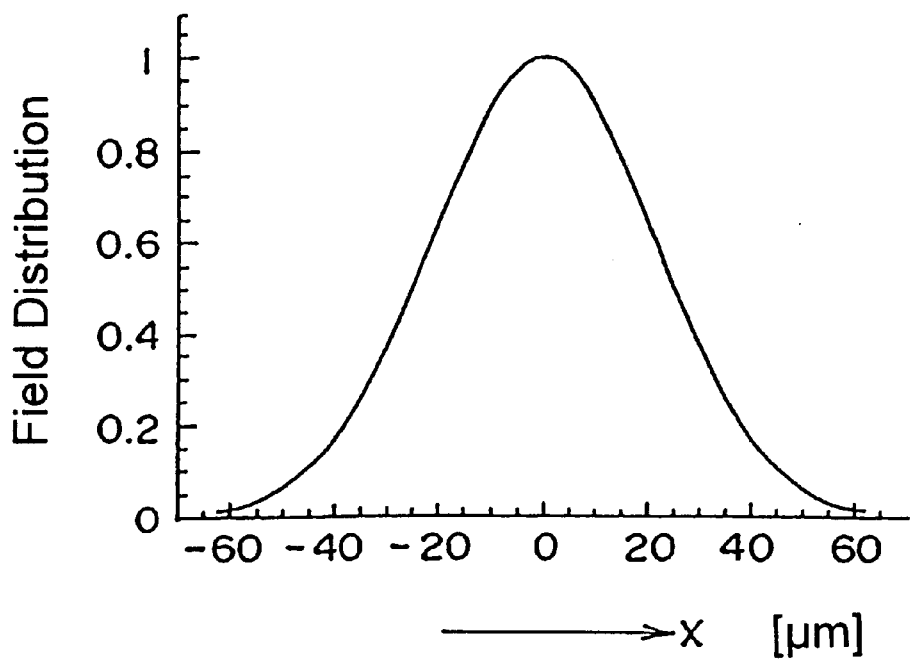
FIGS. 5(a) and 5(b) are graphs showing an example of field distribution in the X and Y direction, respectively of optical waves incident to a field distribution converting optical fiber shown in FIG. 1, FIGS. 6(a) and 6(b) are graphs showing field distribution in the X and Y direction, respectively of an outgoing light when optical waves having field distribution shown in FIG. 5 are made incident into a field distribution converting optical fiber shown in FIG. 1.
Figure 5B:
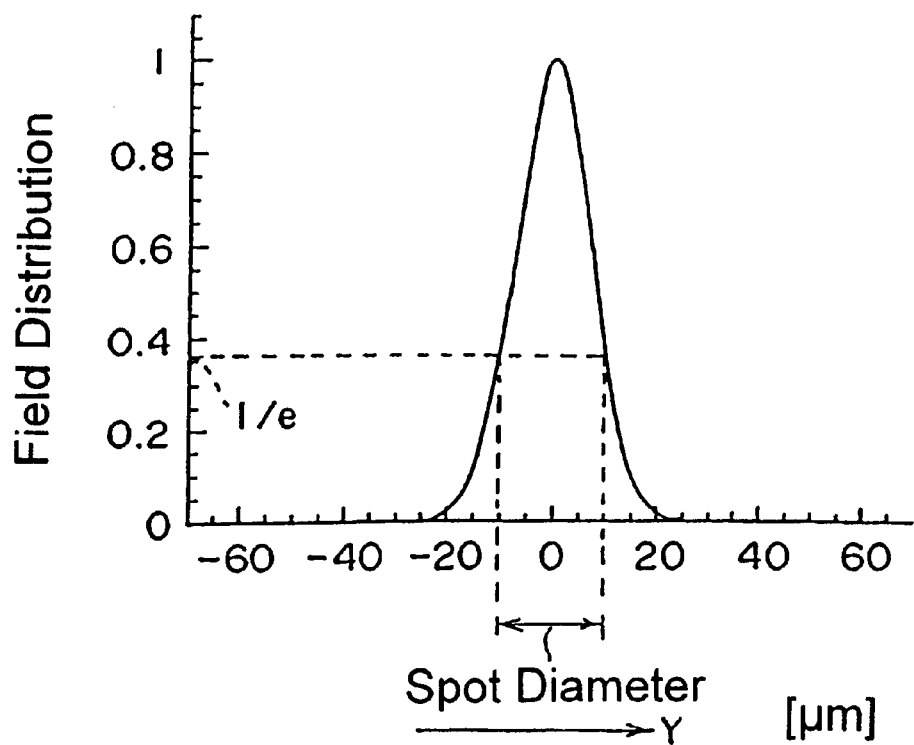

Further, with the method shown in FIG. 4(b), as in an optical fiber shown in FIG. 4(a), a preform of an optical fiber in which the cross-sectional profile of the core 2 and cladding 3 are both circular and the refractive index profiles of the core 2 in the X and Y directions are square-law distribution profiles, is used. And, pressure is given from the side of the cladding 3 while heating the preform, wherein the cross-sectional profile of the core 2 is made elliptical, and the cross-sectional profile of the cladding 3 is made ellipsoidal-shaped or roughly rectangular. In addition, the "ellipsoidal-shaped" in the specification expresses a profile in which a semi-circle is attached to sides at either of the lengthwise or crosswise direction in a rectangle as shown in FIG. 8(a). Also, when producing a field distribution converting optical fiber 1 by using the method shown in FIG. 4(b), the fiber drawing is carried out at a comparatively low temperature. Next, a description is given of actions of a field distribution converting optical fiber 1 according to the preferred embodiment. For example, optical waves having an elliptical profile in which the spot diameter in the X direction is 60 $\mu$m and the spot diameter in the Y direction is 20 $\mu$m, having a field distribution as shown in FIG. 5(a) in the X direction and a field distribution as shown in FIG. 5(b) in the Y direction as a field distribution of optical waves made incident into a field distribution converting optical fiber 1 according to the preferred embodiment are made incident from a laser diode 6 into the incident end 8 of the field distribution converting optical fiber 1 as shown in, for example, FIG. 7. If so, since the aspect ratio of the field distribution of the optical waves is 3, the spot diameters in the X and Y directions cyclically change with respect to a propagation distance of light as in the results of the simulation shown in FIG. 3.

Figure 6A:
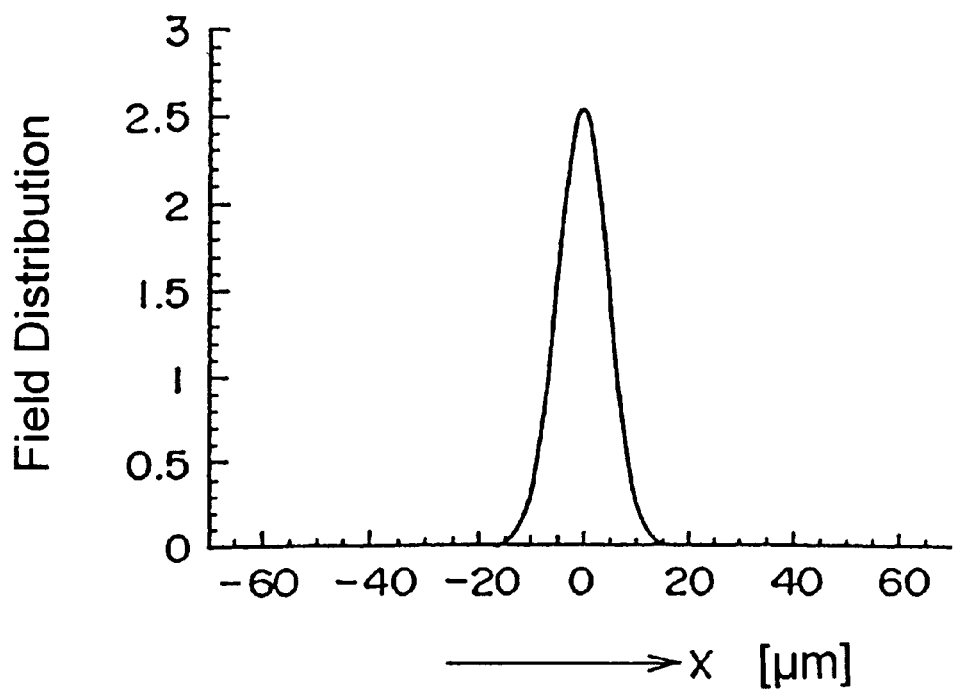
Figure 6B:
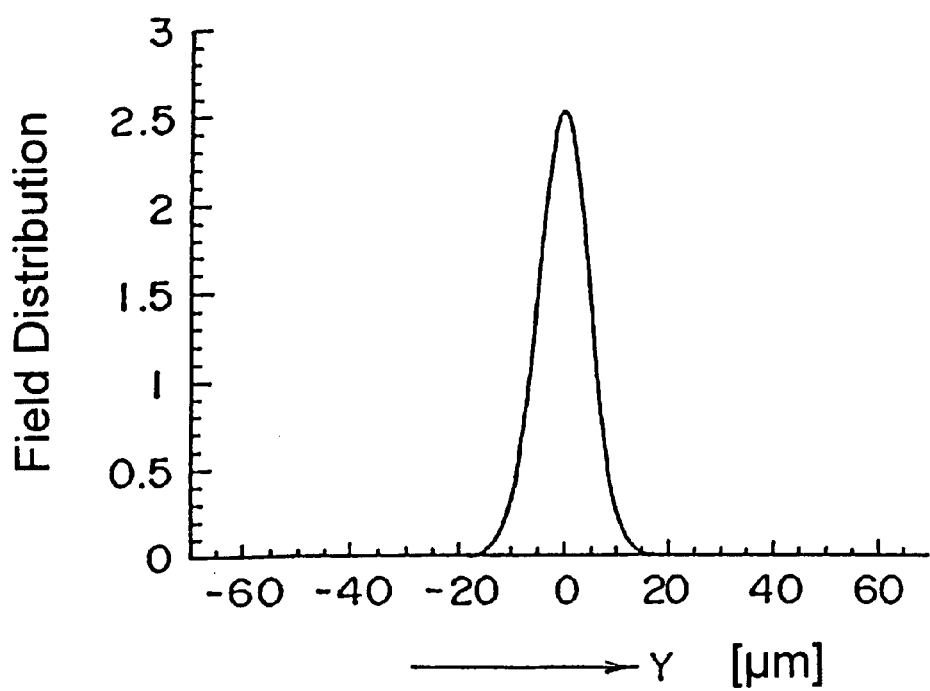

Also, at the outgoing end of the field distribution converting optical fiber 1 according to the preferred embodiment, that is, at a propagation distance of 922 µm of optical waves, field distribution in the X direction and field distribution in the Y direction, respectively, become as shown in FIG. 6(a) and (b), wherein the field distribution in the X and Y directions and spot diameter are made almost equal to each other. That is, optical waves having elliptical field distribution made incident from the incident end of the field distribution converting optical fiber 1 become optical waves having circular field distribution at the outgoing end 9 of the field distribution converting optical fiber 1 and are caused to outgo therefrom.

Figure 7:
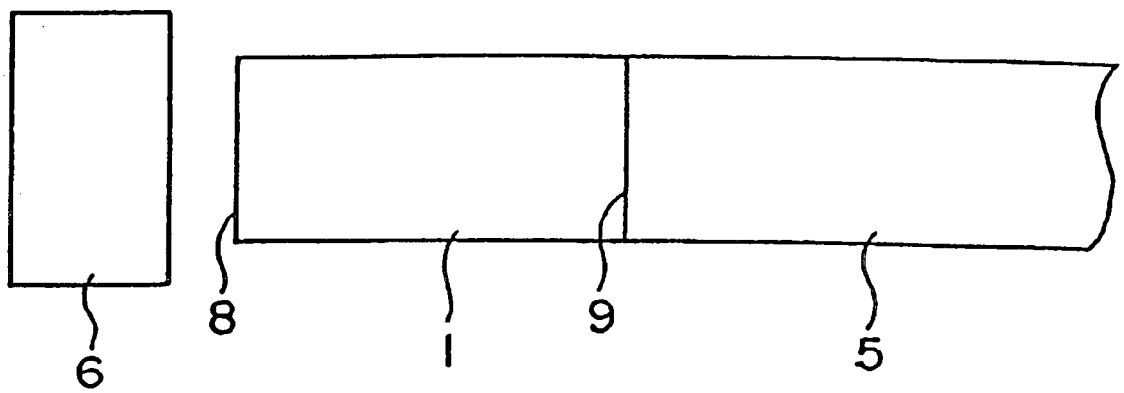
FIG. 7 is an explanatory view showing a connection example between.a field distribution converting optical fiber, a single model optical fiber and a laser diode.
Figure 8A:
FIGS. 8(a) and 8(b) are explanatory views showing a cross-sectional profile of an ellipsoidal-shaped core and a roughly rectangular core, respectively in in another preferred embodiment of a field distribution converting optical fiber according to the invention.

The present inventor investigated, as shown in FIG. 7, the optical connection loss between the field distribution converting optical fiber 1 and single mode optical fiber 5 when the field distribution converting optical fiber 1 according to the preferred embodiment was connected to the single mode optical fiber 5 having a circular profile core 2. For these reasons, the inventor carried out an overlap integral of the field distribution at the outgoing end 9 of the field distribution converting optical fiber 1 and the field distribution of the single mode optical fiber 5 having a spot diameter of 13.6 µm. As a result, it was confirmed that the above optical connection loss was 0.013 dB and the field distribution converting optical fiber 1 according to the preferred embodiment could be connected to the single mode optical fiber 5 with almost no loss.

According to the preferred embodiment, as described above, by making the refractive index profile of the core 2 of the field distribution converting optical fiber 1 in the X and Y directions into square-law distribution profiles, the slopes of which are different from each other, the field distribution change cycles of the optical waves propagating in the XZ and YZ planes of an optical fiber can be made different from each other. In the preferred embodiment, by making the field distribution change cycles of the optical waves propagating in the XZ and YZ planes of an optical fiber different from each other, respectively, it is possible to cyclically change the cross-sectional profiles of the field distribution of the field distribution converting optical fiber 1. In addition, according to the preferred embodiment, since the optical fiber length is set to a length roughly made coincident with a common multiple of one-fourth cycle length of these field distribution change cycles in correspondence to the field distribution change cycles, different from each other, of the optical waves propagating in the above XZ and YZ planes, it is possible to securely make the field distribution profile of optical waves outgoing from the outgoing end 9 of the field distribution converting optical fiber 1 completely circular. Therefore, according to the preferred embodiment, it is possible to carry out mutual conversion from elliptical field distribution to circular field distribution or vice versa.

Using a field distribution converting optical fiber 1 according to the preferred embodiment, as shown in FIG. 7, if a single mode optical fiber 5 having a circular core 2 is connected to the outgoing end 9 side of a field distribution converting optical fiber 1, the field distribution of optical waves transmitted from a laser diode 6 having an elliptical field distribution profile can be converted to a completely circular profile. Also, light transmitted from the laser diode 6, etc., can be made incident into the single mode optical fiber 5 with an almost no optical connection loss.

Figure 8B:

Further, the invention is not limited to the above preferred embodiment, but may be subjected to various embodiments. For example, in the above preferred embodiment, although the core 2 of the field distribution converting optical fiber is made elliptical, the profile of the core 2 thereof may be made ellipsoidal-shaped as shown in FIG. 8(a) and roughly rectangular as shown in FIG. 8(b).

Also, as shown in FIG. 7, a single mode optical fiber 5 is provided at one end side (in the same drawing, at the outgoing end 9 side) of the field distribution converting optical fiber 1, whereby the field distribution converting optical fiber 1 is connected to the single mode optical fiber 5 to make both integral with each other.

In addition, although, in the above preferred embodiment, the elliptical field distribution of optical waves incident into the field distribution converting optical fiber 1 is constructed so that the spot diameter in the X direction is 60 µm and the spot diameter in the Y direction is 20 µm, and that the core 2 of the field distribution converting optical fiber 1 is made elliptical so as to have a core diameter of 120 µm in the X direction and that of 40 µm in the Y direction, the core 2 may be such that it can take in the entirety of the field distribution of optical waves. That is, the size of the core 2 is not specially limited.

Also, a field distribution converting optical fiber according to the invention maybe applicable as an optical fiber for mutual conversion from elliptical field distribution having various aspect ratios to circular field distribution or vise verse. Further, in FIG. 9, the field distribution shown at, for example, A, B and E in FIG. 9, in which the spot diameter Wx in the X direction becomes equal to the spot diameter Wy in the Y direction, is circular field distribution. Also, in the same drawing, mutual conversion from a circle to a representative ellipse or vice versa is illustrated by both-end arrow lines. The relationship between the field distribution spot diameters in the X and Y directions and propagation distance of optical waves when performing mutual conversion from circular field distribution A connected by the both-end arrow lines to elliptical field distribution C, D, F, G and H, is, respectively, illustrated in FIG. 10.

In addition, in FIG. 10, in any case, the abscissa indicates a propagation distance of light passing through the field distribution converting optical fiber, and the ordinate indicates a spot diameter of the field distribution converting optical fiber 1. Further, the characteristic line a indicates a change in the spot diameter in the X direction, and the characteristic line b indicates a change in the spot diameter in the Y direction. An optical fiber is cut off at a distance of point S in these diagrams to form a field distribution converting optical fiber 1, whereby, in FIGS. 10(a) through (e), it is possible to convert circular field distribution A in FIG. 9 to elliptical field distribution C, D, F, G or H.

Figure 9:
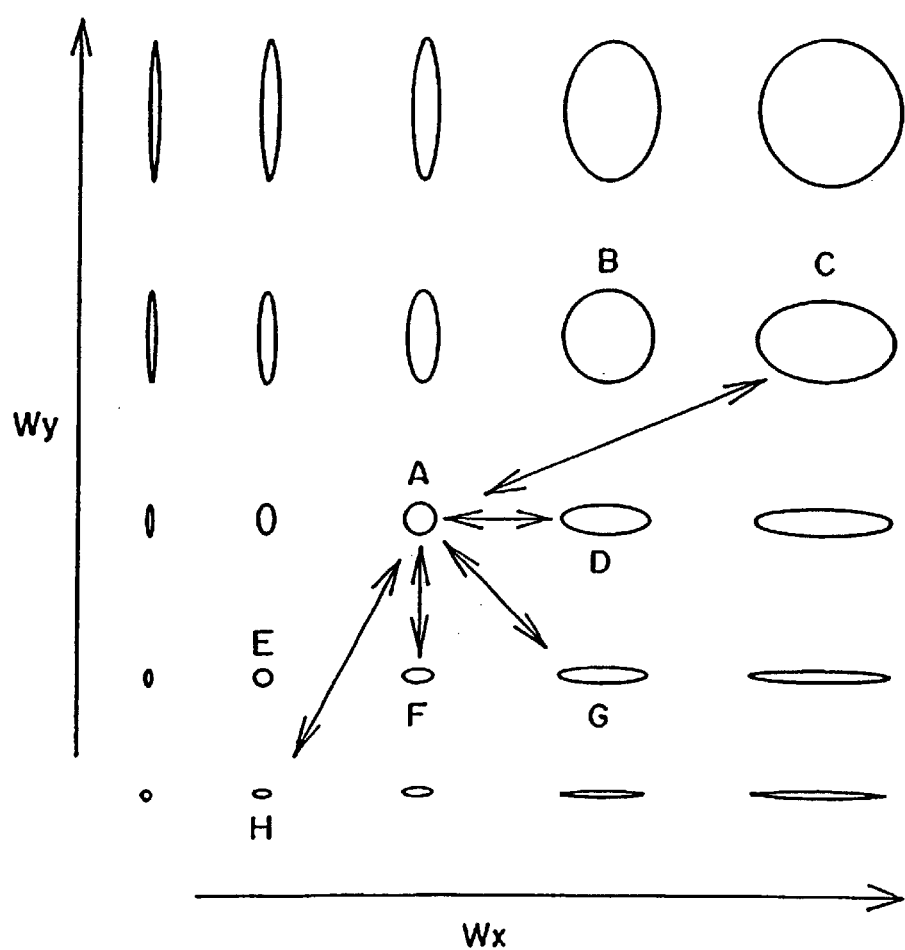
FIG. 9 is an explanatory view showing an example of combinations of mutual conversion from circular field distribution to elliptical field distribution or vice versa.

That is, the length of the field distribution converting optical fiber 1 is made almost equal to the distance to a position S where circular field distribution is obtained, wherein if, for example, optical waves having elliptical field distribution shown at C, D, F, G and H in FIG. 9 are made incident from the incident end 8 side of the field distribution converting optical fiber 1 in FIG. 7, it is possible to cause optical waves having a circular field distribution profile illustrated at A in FIG. 9 to outgo at the outgoing end 9 of the field distribution converting optical fiber 1.

Thus, in the invention, the aspect ratio and size of elliptical field distribution mutually converted are not specially limited, wherein it is possible to freely and mutually convert elliptical field distribution having various aspect ratios and sizes to circular field distribution having various aspects and sizes or vice versa.

Further, in FIG. 9, instead of directly and mutually converting circular field distribution A to elliptical field distribution C or vice versa, mutual conversion of elliptical field distribution C and circular field distribution B and mutual conversion of circular field distribution B and circular field distribution A are continuously carried out.

Figure 12:
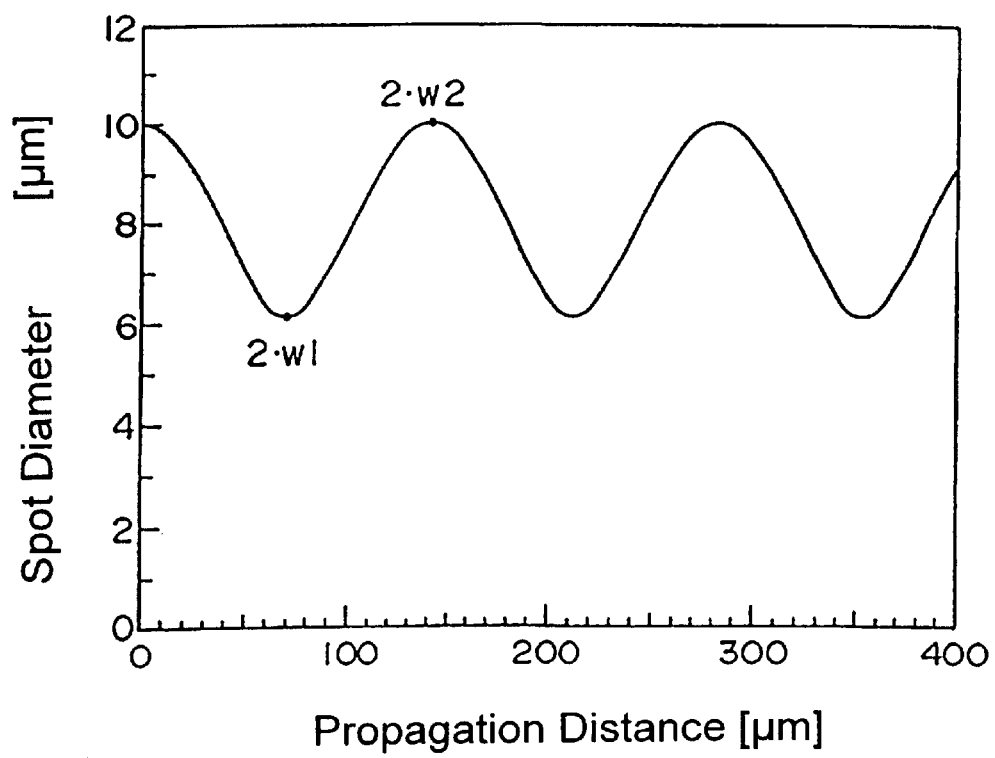
FIG. 12 is a graph showing the relationship between a propagation distance of light and a spot diameter of field distribution when optical waves of a Gaussian type mode are made incident into an optical fiber, having a circular profile core, in which the refractive index profile of the core is a square-law distribution profile.
Figure 13:
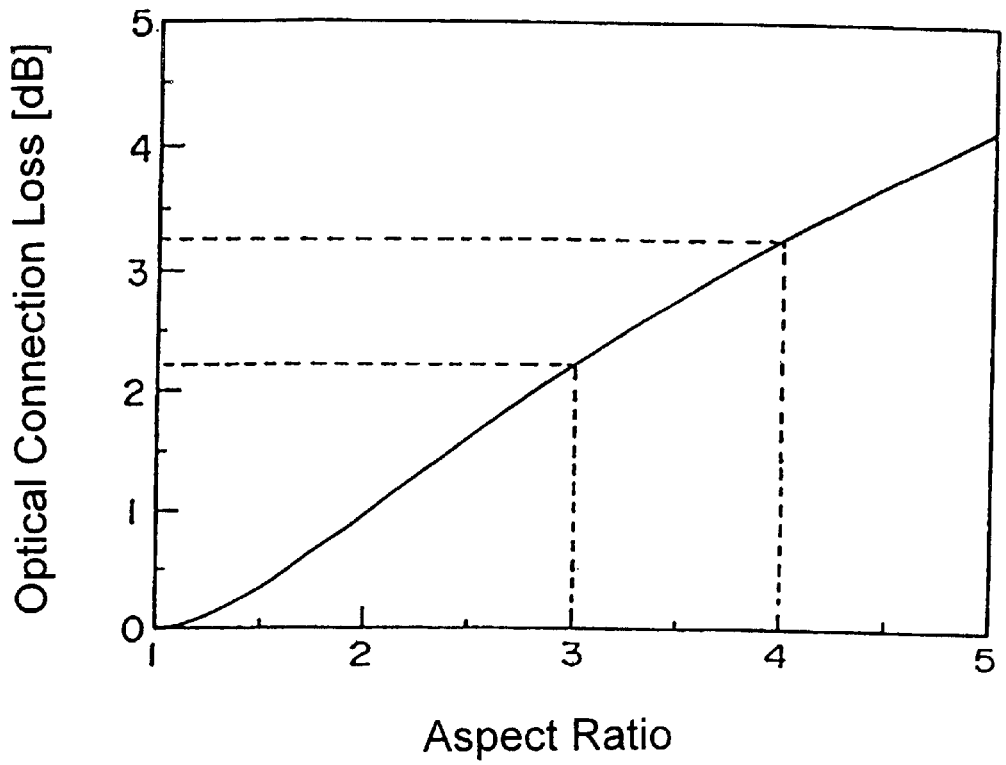
FIG. 13 is a graph showing the relationship in an optical connection loss between elliptical field distribution and circular field distribution, the aspect ratios of which are different from each other.
Figure 14:
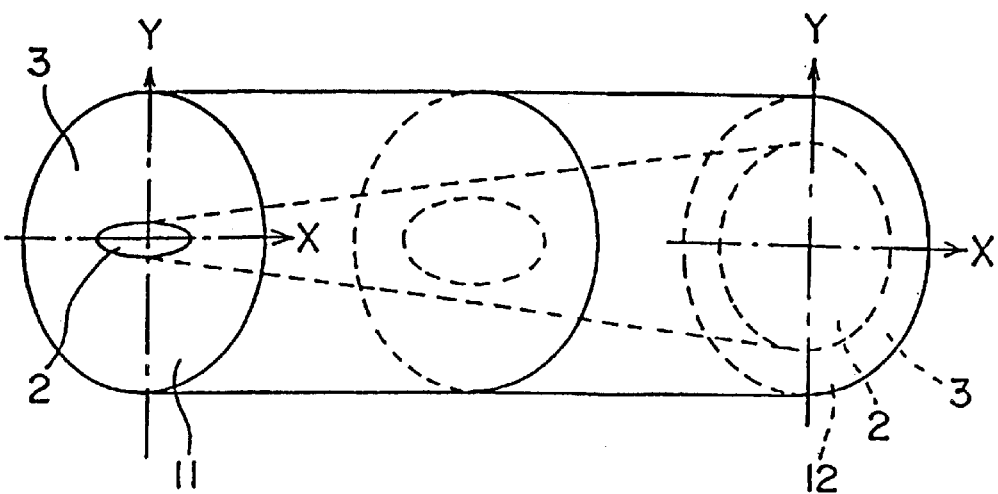
FIG. 14 is an explanatory view showing a method for carrying out mutual conversion between elliptical field distribution and circular field distribution by dopant diffusion of an optical fiber, and FIGS. 15(a) and 15(b) showing changes in the spot diameter in the X and Y directions, respectively with respect to an optical propagation distance of a field distribution converting optical fiber where a field distribution converting optical fiber is constructed of an optical fiber having elliptical field distribution and Ag at which the refractive index profile in the X and Y directions of the core is a square-law distribution profile and the refractive index slope in the Y or X direction satisfies w1=w2.

In addition, when converting different types of circular field distribution of different spot diameters to each other like a conversion of field distributions A and B in FIG. 9, for example, the following may be employed. That is, the profile of the core 2 of an optical fiber is made circular, and the refractive index profile of the core 2 may be made a square-law distribution profile, which is equal in both the X and Y directions. And, as shown in FIG. 12, the length of the optical fiber is set to the odd number times the one-fourth cycle length of the field distribution change cycle on the basis of the data in the relationship between the propagation distance of the optical fiber and the spot diameter of the field distribution, wherein. reduction and enlargement in the spot diameter of field distribution may be carried out.

Further, a field distribution converting optical fiber according to the invention is constructed so that the refractive index profile of one core 2 in either X or Y direction is made into a square-law distribution profile having Ag at which the slope becomes w1=w2, wherein the spot diameter of one field distribution in the X or Y direction may be made into a fixed value without being changed when light propagates in an optical fiber.

Figure 15A:
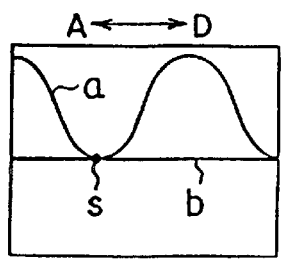

For example, the light propagating distance at the field distribution converting optical fiber 1 having elliptical field distribution shown at D and F in FIG. 9 and having Ag at which the refractive index of the core 2 in the Y or X direction satisfies w1=w2, and changes in the spot diameter in the X and Y directions are illustrated in FIG. 15(a) and (b). Also, in FIG. 15, the abscissa indicates a propagation distance of light passing through a field distribution conversion optical fiber, and the ordinate indicates a spot diameter of the field distribution converting optical fiber, wherein the characteristic line a shows a change in the spot diameter in the X direction, and the characteristic line b shows a change in the spot diameter in the Y direction.

Figure 15B:
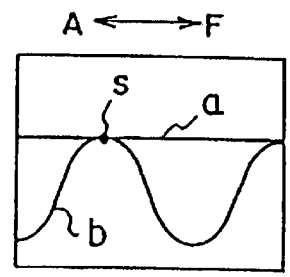
Figure 11A:
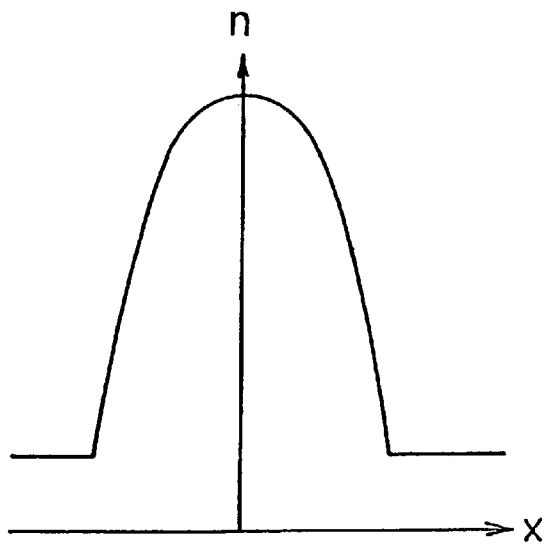
Figure 11B:
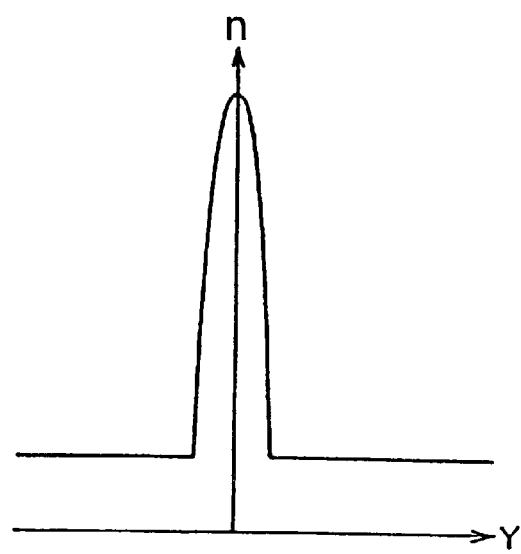

As has been made clear in FIG. 15, an optical fiber is cut off at a distance of point S in the same drawing, that is, so that the optical fiber length becomes almost coincident with the odd number times the one-fourth cycle length of the field distribution change cycle in the Z direction of a light beam propagating in the XZ plane, wherein the field distribution at one end side is made elliptical and the field distribution at the other end side is made circular. Therefore, the field distribution converting optical fiber 1 is formed so that only the refractive index profile of the core 2 in the X or Y direction is made into a square-law distribution profile having Ag at which the slope satisfies w1=w2, wherein if the length is made suitable, it is possible to convert, for example, circular field distribution A to elliptical field distributions D and F in FIG. 9 or vice versa.

Further, in the invention, various field distribution converting optical fibers 1 described above may be used to make a laser diode module by connecting a laser diode 6 to the incident side of the field distribution converting optical fibers 1. The laser diode module thus produced can convert, for example, elliptical field distribution of optical waves transmitted from a laser diode module to a circular field distribution profile by a field distribution converting optical fiber 1 or vice versa. Therefore, such a laser diode module is excellent in that a laser diode module can be connected to a single mode optical fiber with very little connection loss when a single mode optical fiber having a circular profile core is connected to the outgoing end side of the laser diode module.

Industrial Applicability

As described, a field distribution converting optical fiber according to the invention is suitable to carry out mutual conversion from elliptical field distribution to circular field distribution or vice versa, for example, as in a conversion of field distribution of a laser diode to field distribution of an optical fiber, in either direction of reduction or enlargement or at an equal magnification (mutual conversion from a circle having the same diameter as the minor axis or major axis of an ellipse to an ellipse or vice versa). Furthermore, a laser diode module, in which a field distribution converting optical fiber according to the invention is used, is suitable to be used for connection of a laser diode to an optical fiber such as a single mode optical fiber, etc., with very little connection loss.

What is claimed is:

1. A field distribution converting optical fiber having X, Y and Z axes orthogonal to each other, the optical fiber having cladding around a core thereof, wherein the optical axis is the Z axis, a refractive index profile of said core in a direction parallel to each of the X and Y axes having a square-law distribution profile, a slope of the refractive index profile in the direction parallel to the X axis is other than equal to a slope of the refractive index profile in the direction parallel to the Y axis, and the optical fiber length is substantially coincident with a length of a common multiple between a one-fourth cycle length of a field distribution change cycle of a light beam propagating in the XZ plane in a direction parallel to the Z axis and a one-fourth cycle length of a field distribution change cycle of a light beam propagating in the YZ plane in the direction parallel to the Z axis.

2. A field distribution converting optical fiber having X, Y and Z axes orthogonal to each other, the optical fiber having cladding around a core thereof, wherein the optical axis is the Z axis, a refractive index profile of said core in a direction parallel to each of the X and Y axes having a square-law distribution profile, a slope of the refractive index profile in the direction parallel to the X axis is other than equal to a slope of the refractive index profile in the direction parallel to the Y axis, either field distribution in the direction parallel to the X axis or the direction parallel to the Y axis satisfies conditions for which light does not change while propagating in the optical fiber, and the optical fiber length is substantially coincident with a length of a multiple of a one-fourth cycle length of the field distribution change cycle, in a direction parallel to the Z axis, of a light beam propagating in the XZ plane or YZ plane, which changes due to propagation of light.

3. A field distribution converting optical fiber as set forth in claim 1, wherein the cross-sectional shape of the core is made substantially elliptical, substantially ellipsoidal-shaped or substantially rectangular.

4. A field distribution converting optical fiber as set forth in claim 1, wherein a single mode optical fiber is provided at one end side of the optical fiber.

5. A field distribution converting optical fiber as set forth in claim 3, wherein a single mode optical fiber is provided at one end side of the optical fiber.

6. A field distribution converting optical fiber as set forth in claim 1, comprising a second optical fiber portion having X, Y and Z axes orthogonal to each other, the second optical fiber portion having cladding around a second core portion thereof, wherein the optical axis is the Z axis, a refractive index profile of said second core portion in a direction parallel to each of the X and Y axes having a square-law distribution profile, a slope of the refractive index profile in the direction parallel to the X axis is approximately equal to a slope of the refractive index profile in the direction parallel to the Y axis, wherein the second optical fiber portion is formed such that the length thereof is substantially coincident with an odd number times a one-fourth cycle of the field distribution change cycle, along the direction parallel to the Z axis, of a light beam propagating in the XZ plane and YZ plane, and wherein in use the second optical fiber portion is optically coupled to a single mode optical fiber.

7. A field distribution converting optical fiber as set forth in claim 3, comprising a second optical fiber portion having X, Y and Z axes orthogonal to each other, the second optical fiber portion having cladding around a second core portion thereof, wherein the optical axis is the Z axis, a refractive index profile of said second core portion in a direction parallel to each of the X and Y axes having a square-law distribution profile, a slope of the refractive index profile in the direction parallel to the X axis is approximately equal to a slope of the refractive index profile in the direction parallel to the Y axis, wherein the second optical fiber portion is formed such that the length thereof is substantially coincident with an odd number times a one-fourth cycle of the field distribution change cycle, along the direction parallel to the Z axis, of a light beam propagating in the XZ plane and YZ plane, and wherein in use the second optical fiber portion is optically coupled to a single mode optical fiber.

8. A field distribution converting optical fiber as set forth in claim 1, comprising a laser diode connected to an incident side of the optical fiber.

9. A field distribution converting optical fiber as set forth in claim 2, wherein the cross-sectional shape of the core is made substantially elliptical, substantially ellipsoidal-shaped or substantially rectangular.

10. A field distribution converting optical fiber as set forth in claim 2, having a single mode optical fiber optically coupled at one end side thereof.

11. A field distribution converting optical fiber as set forth in claim 9, having a single mode optical fiber optically coupled at one end side thereof.

12. A field distribution converting optical fiber as set forth in claim 2, comprising a second optical fiber portion having X, Y and Z axes orthogonal to each other, the second optical fiber portion having cladding around a second core portion thereof, wherein the optical axis is the Z axis, a refractive index profile of said second core portion in a direction parallel to each of the X and Y axes having a square-law distribution profile, a slope of the refractive index profile in the direction parallel to the X axis is approximately equal to a slope of the refractive index profile in the direction parallel to the Y axis, wherein the second optical fiber portion is formed such that the length thereof is substantially coincident with an odd number times a one-fourth cycle of the field distribution change cycle, in the direction parallel to the Z axis, of a light beam propagating in the XZ plane and YZ plane, and wherein in use the second optical fiber portion is optically coupled to a single mode optical fiber.

13. A field distribution converting optical fiber as set forth in claim 9, comprising a second optical fiber portion having X, Y and Z axes orthogonal to each other, the second optical fiber portion having cladding around a second core portion thereof, wherein the optical axis is the Z axis, a refractive index profile of said second core portion in a direction parallel to each of the X and Y axes having a square-law distribution profile, a slope of the refractive index profile in a direction parallel to the X axis is approximately equal to a slope of the refractive index profile in a direction parallel to the Y axis, wherein the second optical fiber portion is formed such that the length thereof is substantially coincident with an odd number times a one-fourth cycle of the field distribution change cycle, along the Z axis direction, of a light beam propagating in the XZ plane and YZ plane, and wherein in use the second optical fiber portion is optically coupled to a single mode optical fiber.

14. A field distribution converting optical fiber as set forth in claim 2, comprising a laser diode optically coupled at an incident side of the optical fiber.

15. A field distribution converting optical fiber as set forth in claim 3, comprising a laser diode optically coupled at an incident side of the optical fiber.

16. A field distribution converting optical fiber as set forth in claim 4, comprising a laser diode optically coupled at an incident side of the optical fiber.

17. A field distribution converting optical fiber as set forth in claim 5, comprising a laser diode optically coupled at an incident side of the optical fiber.

18. A field distribution converting optical fiber as set forth in claim 6, comprising a laser diode optically coupled at an incident side of the optical fiber.

19. A field distribution converting optical fiber as set forth in claim 7 comprising a laser diode optically coupled at an incident side of the optical fiber.

20. A field distribution converting optical fiber as set forth in claim 9, comprising a laser diode optically coupled at an incident side of the optical fiber.

* * * * *

UNITED STATES PATENT AND TRADEMARK OFFICE
CERTIFICATE OF CORRECTION

PATENT NO. : 6,349,162 B1
DATED : February 19, 2002
INVENTOR(S) : Shiraishi et al.

It is certified that error appears in the above-identified patent and that said Letters Patent is hereby corrected as shown below:

<u>Title page,</u>
Item [73], please add the name of the second Assignee as follows:
-- Kazuo SHIRAISHI --.

Signed and Sealed this

Eighteenth Day of June, 2002

*Attest:*

*Attesting Officer*

JAMES E. ROGAN
*Director of the United States Patent and Trademark Office*